US012699951B2

(12) United States Patent
Leoni et al.

(10) Patent No.: US 12,699,951 B2
(45) Date of Patent: Aug. 4, 2026

(54) SYSTEM AND METHOD FOR OUTPUTTING COORDINATION OF TRANSPORT OF ITEMS

(71) Applicant: Michael C. Leoni, Ann Arbor, MI (US)

(72) Inventors: Michael C. Leoni, Ann Arbor, MI (US); Dominic Leoni, Ann Arbor, MI (US)

(73) Assignee: Michael C. Leoni, Ann Arbor, MI (US)

( * ) Notice: Subject to any disclaimer, the term of this patent is extended or adjusted under 35 U.S.C. 154(b) by 0 days.

(21) Appl. No.: 17/544,153

(22) Filed: Dec. 7, 2021

(65) Prior Publication Data

US 2022/0180310 A1     Jun. 9, 2022

Related U.S. Application Data

(60) Provisional application No. 63/122,762, filed on Dec. 8, 2020.

(51) Int. Cl.
G06Q 10/0834          (2023.01)

(52) U.S. Cl.
CPC ............................... G06Q 10/0834 (2013.01)

(58) Field of Classification Search
None
See application file for complete search history.

(56) References Cited

U.S. PATENT DOCUMENTS

| | | | |
|---|---|---|---|
| 7,292,989 B2 | 11/2007 | DeMaggio | |
| 8,600,908 B2 | 12/2013 | Lin et al. | |
| 2007/0038506 A1 | 2/2007 | Noble et al. | |
| 2014/0156472 A1* | 6/2014 | Stuntebeck | G06Q 10/087 |
| | | | 705/28 |
| 2018/0046964 A1 | 2/2018 | Leoni et al. | |
| 2019/0066033 A1* | 2/2019 | Mains, Jr. | G06Q 10/06311 |
| 2019/0095859 A1* | 3/2019 | Pike | G06Q 10/0834 |
| 2019/0228375 A1* | 7/2019 | Laury | G06Q 10/0836 |
| 2020/0097900 A1* | 3/2020 | Kibbey | G06F 16/212 |
| 2020/0160264 A1* | 5/2020 | Silverman | G06Q 10/06315 |
| 2020/0311674 A1* | 10/2020 | Salter | G06Q 10/0833 |

OTHER PUBLICATIONS

Kilcarr, Sean—"Working Together" FleetOwner. Jun. 6, 2016.

* cited by examiner

*Primary Examiner* — George Chen
*Assistant Examiner* — Duane N. Moore
(74) *Attorney, Agent, or Firm* — Harness, Dickey & Pierce, P.L.C.

(57) ABSTRACT

Disclosed is a system and process that include inputs and verification of various portions of a logistical system from an outset to an ending. In various embodiments, the logistical system may include a profile for any one of a plurality of entities to allow for inclusion or selection in one or more steps of a logistic process. The logistical system may further allow for selection of a driver, provisional of selected qualifications, and determination and/or confirmation of an action, such as delivery.

20 Claims, 7 Drawing Sheets

SYSTEM AND METHOD FOR OUTPUTTING COORDINATION OF TRANSPORT OF ITEMS

CROSS-REFERENCE TO RELATED APPLICATIONS

This application claims the benefit of both U.S. Provisional Application No. 63/122,762, filed on Dec. 8, 2020, entitled System and Method for Outputting Coordination of Transport of Items." The entire disclosure of the above application is incorporated herein by reference.

FIELD

The present disclosure relates to transporting items, and particularly to efficient transport and delivery.

BACKGROUND

This section provides background information related to the present disclosure which is not necessarily prior art.

In various systems, such as in a shipping system, various parties or entities perform various portions of the transfer of items. The parties may include a shipper, receiver, dispatcher, carrier, and/or driver. Each of the entities may include various requirements and/or qualifications. The various qualifications and/or requirements, however, may not be easily identifiable to each other ab initio.

SUMMARY

This section provides a general summary of the disclosure, and is not a comprehensive disclosure of its full scope or all of its features.

Disclosed is a system and process that include inputs and verification of various portions of a logistical system from an outset to an ending. In various embodiments, the logistical system may include a profile for any one of a plurality of entities to allow for inclusion or selection in one or more steps of a logistic process. The logistical system may further allow for selection of a driver, provisional of selected qualifications, and determination and/or confirmation of an action, such as delivery.

A driver may have a certification for operating a loading or unloading device, such as a forklift. The certification may be made by any selected certifying entity and may be accepted by one or more of entities, such as a shipper, carrier, dispatcher, and/or receiver. The driver may be a driver of a vehicle, such as a tractor-trailer, that may carry a load of one or more items. The load and/or items may be of a selected size, quantity, type, or the like. The driver may further have a certification for operation of a loading or unloading vehicle, such as a forklift. The certification may be obtained included in a driver profile that is accessed by the logistical system, as disclosed herein. Therefore, the various entities may access the logistical system to at least one of (1) identify a driver having a selected certification, (2) select the driver, and/or (3) instruct the driver to perform additional tasks in addition to driving a load to a selected location.

Further the logistical system may allow for access to a restricted area by the driver. For example, the driver may drive the load to a secure location. At the secure location, the driver may access the logistical system or have the logistical system provide to the driver a key or access code to allow access to a secure location. The driver may then be able to proceed through a gate or other barrier into the secure location for delivery of a load. The driver may then unload a selected item at a delivery location.

In various embodiments, the driver may provide information to any of the entities accessing the logistical system, such as providing a written, verbal, and photographic information of a condition and/or location of an item. One or more items may be included in a load or delivery load. The driver may photograph and/or provide a description of the one or more items of the load. The description and photograph may be acquired at any appropriate time, such as prior to loading the items onto a vehicle, after loading the items onto a vehicle, at selected intervals during transit, at a delivery location, and/or after delivery of the items and load at the location. At each of the selected time periods, the driver may upload information to the logistical system such that any of the users or entities may have access to the information and at selected intervals during the pickup, transfer, and delivery of the items.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figures 8, 9:
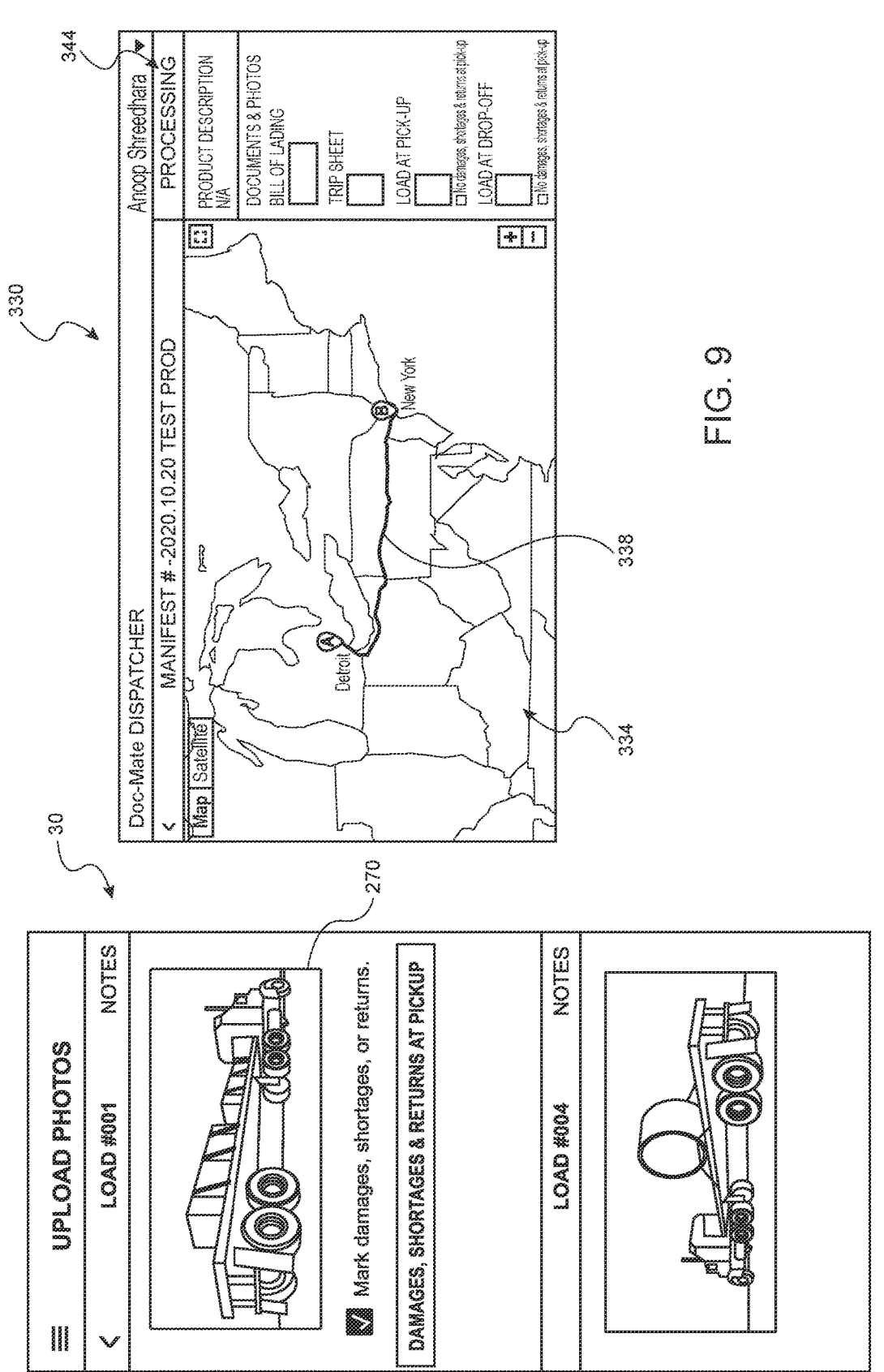

FIG. 8 a user interface screen shot of a stakeholder system, according to various embodiments; and FIG. 9 a user interface screen shot of a stakeholder system, according to various embodiments.

Corresponding reference numerals indicate corresponding parts throughout the several views of the drawings.

DETAILED DESCRIPTION

Example embodiments will now be described more fully with reference to the accompanying drawings.

SUMMARY

As illustrated in the figures, a schematic and/or a flowchart/diagram of at least a portion of a logistical system is illustrated and described herein, according to various embodiments. The logistical system may be implemented with a selected processor module that executes instructions, etc. The logistical system may be operated and be accessed with a user interface having a selected user experience.

With a user interface a selected entity (also referred to as a user), such as a shipper, receiver, and/or dispatcher, to provide information regarding one or more locations (which may also be referred to as a location profile) and to review information of one or more of the entities (which may be included in one or more profiles, such as a driver profile). The selected user may identify various features for each individual location and create a profile for the selected location. Each location and/or carrier profile may include an identification or determination of self-load or self-unload. Self-load is used herein to generally refer to a driver loading a vehicle to be driven by the driver. Self-unload may refer to a driver that may unload a vehicle that is driven by the driver. In various embodiments a non-self-load or non-self-unload may be a driver driving a vehicle to a selected location and a different or alternative user or system may load or unload the vehicle driven by the driver.

A user may create a load and provide various identification profiles there for, such identifying it as being a self-load or self-unload. The load may include one or more items and may refer to a request to transport the items and instructions related thereto. A user may include a shipper or receiver that identifies a particular item that is included in a load to be moved by a transport entity. A transport entity may include all of and/or any of a dispatcher, a driver, a carrier, or the like. In various embodiments, a driver may be employed by a carrier, be an independent contractor contracted by a carrier, and/or be a single vehicle driver and carrier.

In selecting a driver and/or carrier for a load, the load creator may provide various allowances (e.g., self-load and/or unload), driver requirements, or the like. Various other entities, such as a dispatcher and/or carrier may assign or allow access to the load by selected drivers that include qualifications (e.g. certified to load and unload) and/or allow selection by one or more of the other users. Various information may be verified with external systems. In having access, the driver may then select to accept or reject a load.

In various embodiments a driver may include or have access to selected portions of the logistics system, such as with a mobile application that may be accessed with a mobile device, such as a cellular phone. The driver may be able to provide selected information, such as identifying information for the driver, certifications of the driver, or the like. Further, the driver may be able to access the logistics system to accept or reject (including un-accept) various loads for transport. For example, the dispatcher entity may assign a load to a particular driver and the driver may accept or reject the load. In various embodiments, a dispatcher may provide a request to a plurality of drivers and the first driver to accept may transport the load.

The logistical system may then be used to notify the dispatcher or other appropriate entities of a status of the load, such as once the load is accepted and/or rejected. The logistical system may include updates or provide updates at selected times, such as at accepting a load, a notification after a selected period of time of creating a load, or the like. Nevertheless, the driver may access information, such as profiles of delivery locations, pickup locations, load items, and the like with the logistics system, such as through the mobile application accessed or used by the driver.

Further, during selected periods the driver may provide information to the logistical system, such as through the mobile application. The driver may take pictures with a selected camera, such as a mobile phone camera at selected periods or at selected times. For example, the driver may take a picture of a load prior to loading it onto a vehicle, after loading it onto a vehicle, at selected intervals during transport, at delivery, (including after being unloaded from the vehicle), or at any appropriate time. Thus, the driver may provide photo information regarding a specific status and/or placement of the load (including selected items).

Further, the photographic information may be used to identify specifics and if specific items are in a load and/or contents of a load including a plurality of items. For example, the photograph may identify the load as being large and heavy, able to be moved as a single unit or as multiple units, and/or requiring specialized equipment to load or unload the vehicle at the delivery location (e.g., a forklift). Therefore, the driver may provide information to entities using the logistics system to assist in delivery of the load including the items therein at a selected time.

Further the driver may provide information, such as completing a bill of lading and/or photographing and uploading the same.

The logistical system may allow for real-time tracking of a load once placed on the vehicle.

The location profile may include a self-load such that the driver may load the vehicle with the items. The driver may provide identification, such as a photograph thereof, of the items being loaded.

The logistical system may then track the position of the items, in an appropriate manner, during transport. In various embodiments, the mobile application may allow for a continuous identification of a location of the mobile device which may be kept by the driver to determine a location of the load related to the device. Thus, real-time updates regarding a position of various loads may be made. Further, the driver may provide additional updates, such as a further photographs, including location, traffic, other conditions, item conditions, or the like.

Accordingly the logistical system may allow for the identification of various locations that may allow the driver to load and unload the delivery vehicle rather than requiring an additional or alternative person. The driver may also provide a profile including qualifications of the driver. Thus, the logistical system may allow for selection and output of a selected driver that may match requirements and/or allowances of a selected receiver location and receiver.

The logistical system may allow for providing access information to a driver to allow access to secure sites or locations without requiring additional or alternative individuals to give access to selected locations. The logistical system may execute instructions to provide outputs regarding selected drivers, matches of driver qualifications to location and/or load requirements, access to selected information or restrictions thereto, etc. Thus, the logistical system may be operated to assist in the outputs as discussed above and herein.

Thus, the driver may more efficiently transport a load of items from one location to another by (1) eliminating the need of acquiring additional individuals for access to a delivery sites, (2) providing less limited loading or unloading to specific delivery times, (3) eliminating a requirement for additional individuals to load or unload a vehicle rather than the driver loading and unloading the vehicle by themselves. Thus, the driver and other entities using the logistical system may provide and evaluate qualifications of a driver and/or requirements of a load or location and provide an efficient output of matches between a driver and various other portions evaluated by the logistical system such as a load, location, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Detailed Logistics System/Program

Figure 1:
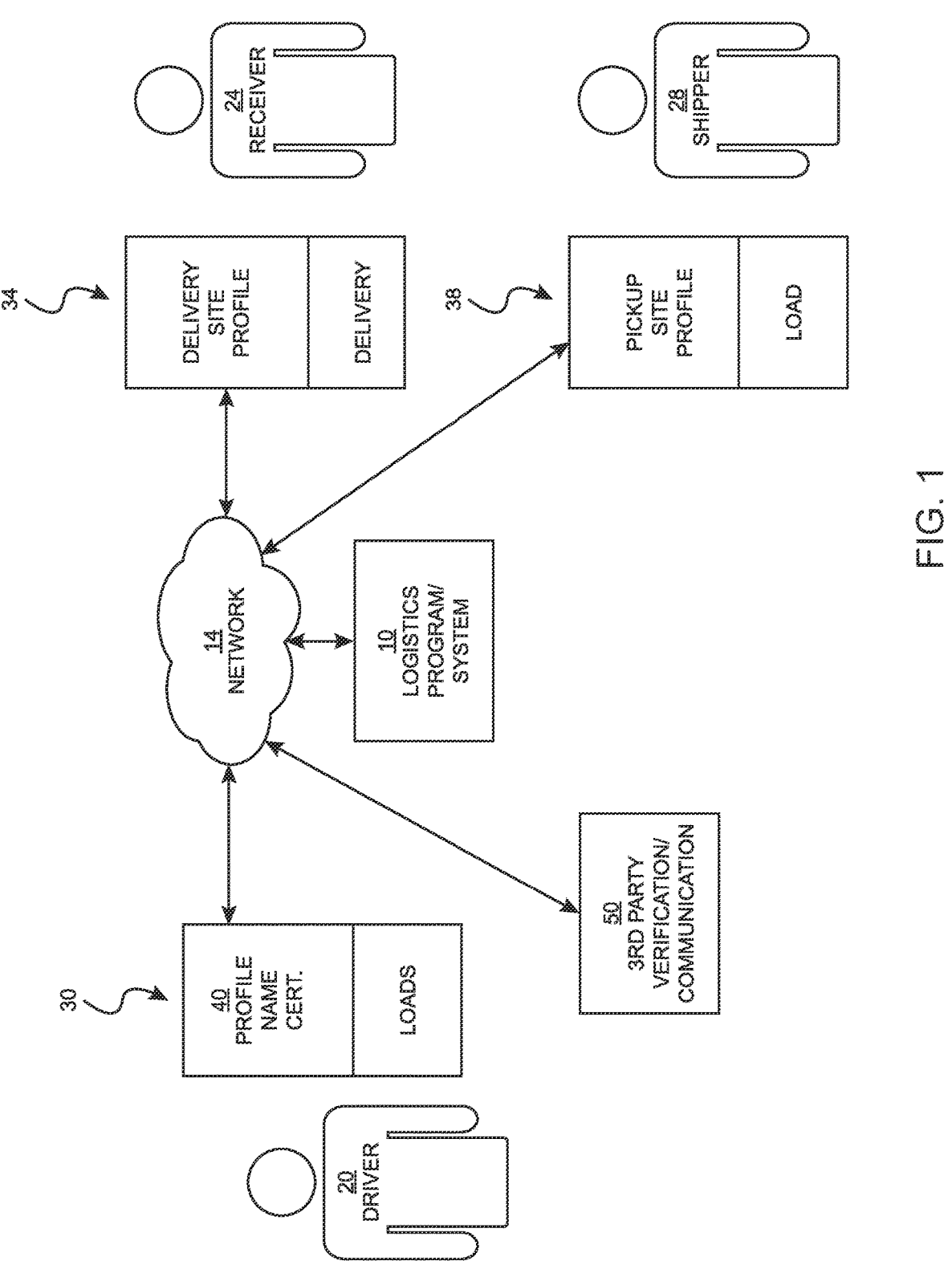
FIG. 1 is a schematic illustration of various stakeholders and communication systems, according to various embodiments.
Figure 2:
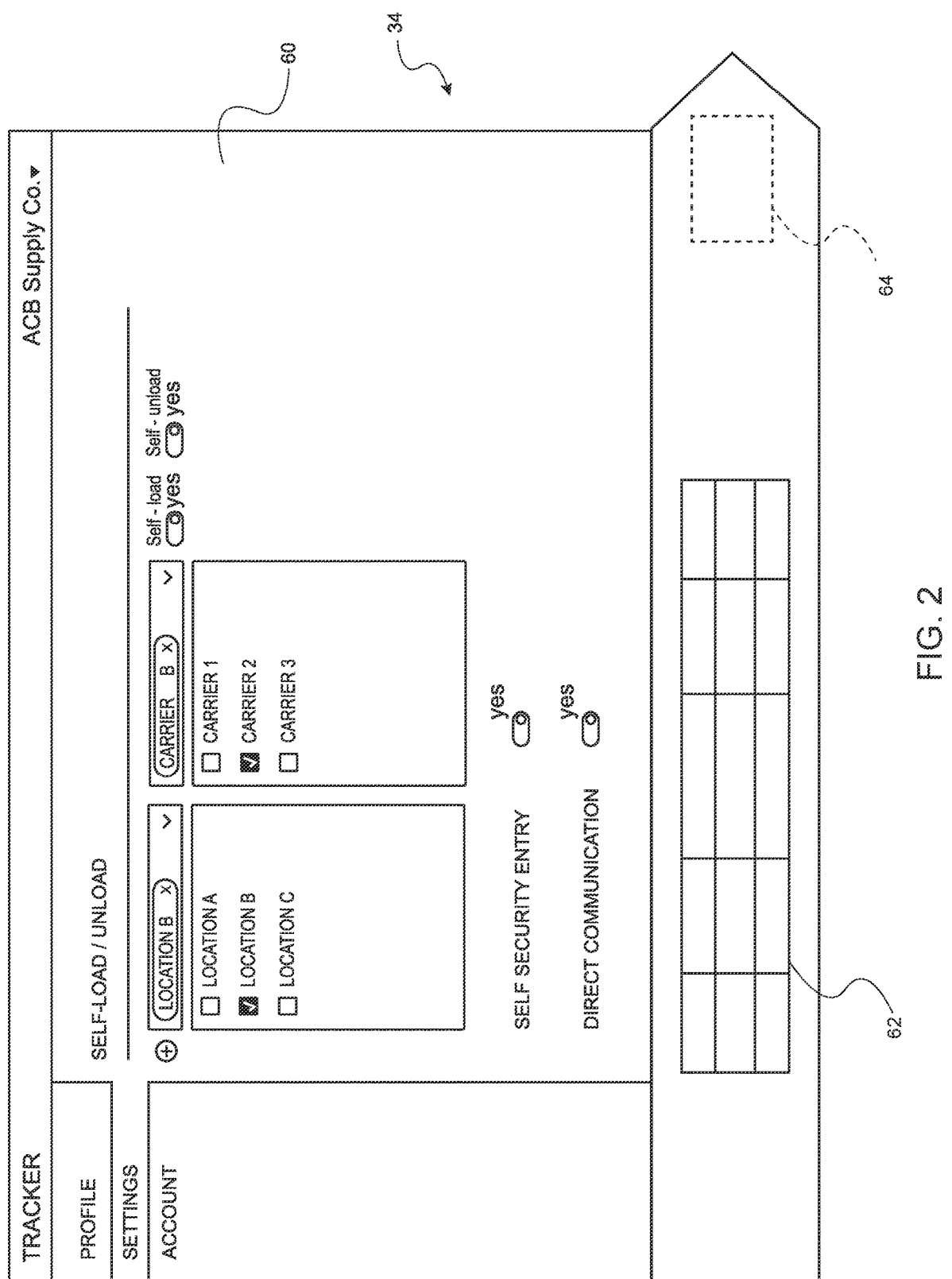
FIG. 2 is a schematic illustration of a receiver system, according to various embodiments.

With initial reference to FIG. 1, the logistics program/ system 10, as discussed above, may be incorporated or accessed by various users (e.g., stakeholders) as discussed herein. For example, the logistics program or system 10 may be stored on a selected storage system, such as a readable memory and accessed directly and/or indirectly, such as through a network 14. The network 14 may be a general access network and selected security measures may be provided for access directly to the logistics program system 10 and/or may be a secure private network. Nevertheless, the network 14 allows for access of the various users to the logistics program/system 10 as discussed further herein.

The various users may include a driver 20, a receiver 24, and/or a shipper 28. Each of the users 20, 24, 28 may interact with the logistics program/system 10 through various personal or individual systems including personal computers, portable cell phone, etc. The systems may include a driver system 30, a receiver system 34, and/or a shipper system 38. Each of the systems may include one or more accessible memories, processor modules or systems, inputs (e.g., keyboard, mouse, touchscreen), and/or outputs (e.g., displays) for various purposes. The systems may be portable or used at a selected location. Further, the systems may have additional sensors, such as global positioning system (GPS) sensors and maybe be configured and/or operated to automatically transmit selected data (e.g., location data based on the GPS). As discussed above, each of the users 20-28 may generate, save, or transmit selected profiles for various purposes and the individual consoles 30-38 may be used to provide the same.

For example, the driver console 30 may allow the driver to input a profile 40. The profile 40 may include identification of the driver 20, such as name, user ID, and the like. Further the driver 20 may input selected certification such as driving certifications, forklift certifications, or the like. The profile of the driver may be transferred to the logistics program/system 10 and/or accessed from the driver system 30. The logistics program/system, however, may allow for access of the driver profile 40 by the other users, such as the receiver 24 and/or the shipper 28.

The receiver 24 may input a profile for a delivery site, which may also be referred to as a delivery site profile. The delivery site profile may include various features or identifications such as selected delivery locations, delivery times, whether a driver may self-unload (e.g. operate a forklift at a location for offloading items from the truck), or other appropriate features for a delivery site. The delivery profile may also include approved drivers, unapproved drivers, approved logistics companies or dispatch companies or the like. Therefore, the receiver 24 may provide a delivery site profile with the delivery requirements and/or allowances at the delivery site. The receiver 24 may input the delivery site profile that may be uploaded and provided to the logistics program/system to assist in identifying an appropriate driver and/or allowing the driver to select appropriate loads.

Further, the shipper 28 may also provide a pick-up site profile with the shipper module 38. The pick-up site profile may also include various identification or information such as pick up times, location, self-loading allowance, or the like. The pick-up site profile provided by the shipper 28, therefore, may also by uploaded to the logistics program/ system 10. Again, the pick-up site profile may assist in identifying an appropriate driver and/or the driver 20 in selecting selected loads.

The selected systems also allow for the respected users to provide details about specific loads and/or deliveries. For example, the driver 20 may review the driver system 30 to select load, identify loads for pick-up and delivery, and provide details regarding the loads during a transit. As discussed herein, the driver may provide evidence of a condition of the load (e.g., via photographs) and/or location (e.g., vie Global Positioning System (GPS) tracking and transmission). The receiver 24 may provide delivery instruction, time and the like for a specific load with the receiver system 34. Further the shipper 28 may provide load details including amount, delivery, time frames, and the like through the shipper system 38.

Communication and/or data may be provided between each of the users. The logistics program/system 10 may coordinate and allow communication, such as in real time. Communication may be to and from each users system, such as the receiver system 34 and the driver system 30. In other words, all of the respective systems 30-38 may communicate with and/or through the logistics program/system 10 and allow for substantially direct and/or indirect communication with each of the other parties or stakeholders of the supply chain or transit logistics system.

Additionally, in various embodiments, third party or independent verification systems or communication systems 50 may also be provided and/or accessed. For example, the driver 20 may identify or input a certification in the driver system 30. The third-party verification system 50 may receive a certification and confirm the certification within or to the logistics program/system 10. Therefore, a third-party verification may be provided to the receiver 24 and the shipper 28 that may be accessed due to respective systems 34 or 38. Thus, the receiver or shipper may provide or have further verification and/or clarification of the attributes or certifications of the driver 20 and/or vice versa.

As discussed above, the receiver 24 includes an input system 34 that may include a display 60, a user input 62, which may include a keyboard, mouse, or the like, a touchscreen, or other appropriate input. The system may also include a memory and/or processor module 64. The receiver system 34 may communicate with the logistics program/system 10, as discussed above. Communication may be with any appropriate communication protocol or process, such as wireless and/or via the network.

When providing a profile or settings, the receiver may identify one or more locations, such as locations A, B or C and one or more carrier's, such as carrier's 1, 2, and 3, and various selected features therefore. For example, receiver 24 may identify whether a particular location for a particular carrier may be a self-unload location or not by indicating as yes or no in a user interface with the receiver system 34. Additional features and/or operations may be provided in addition to identifying a location as a self-load or unload. For example, an indication of whether any direct communication may be provided between the driver and the site, such as the site manager, may be identified. Direct communication may also be indicated as a yes or no on the user interface. Further, to assist with self-load or unload, the receiver 24 may identify whether a secured self-entry (self-security entry) may be made at a particular location for a particular carrier.

The secured self entry may include providing the driver 20 with an entry code or key at a selected time and/or location. For example, a security code may be provided based on a geo-fence location relative to the driver 20, such as by tracking the driver system 30 with a GPS system. In various embodiments, the secured entry may be allowed only when the driver 20 and/or the driver system 30 is at a selected location. The selected location may include within a selected distance of a gate. Further, the gate may be automatically opened based on one or more of direct communication and/or geo-fencing.

The provision of an entry credential (e.g., an identification code to be entered on a keypad, QR code to be optically scanned, etc.) based on a geo-fenced location may limit the time and ability of non-approved individuals to enter a location. That is the credential is given to the driver only when the driver is at a specified location and/or within a selected range of a specific location. Thus, it need not be based entirely or at all on time.

Moreover, the driver 20 may be allowed to enter at any time it is convenient or efficient for the driver to enter to unload. Thus, the driver may enter at a time when the receiver site is not busy (e.g., after construction hours) for ease and efficient access to an unloading site. Thus, the driver 20 may operate the delivery vehicle in a time efficient and useful manner. Moreover, the provision of the entry credentials to the driver reduces or eliminate needs for labor to allow the driver access to a receiver site.

Additionally, various entry credentials may be provided to the driver 20, such as on driver system 30 including a personal identification number, a barcode, an RFID identification, or other appropriate specific identification for secured entry. The entry credentials may be provided when a load is accepted and/or based on a geo-fenced location or time.

Thus, the receiver 24 may identify for one of more locations and for one or more respective carrier combinations of features when creating a profile and settings. As discussed above, these may include the self-unload, direct communication, and/or self-entry. The profiles may be saved and/or transmitted to the system 10. A database of profiles, therefore, may be created, saved, and/or accessed at selected times by the system 10 and/or the users.

As discussed above, the driver 20 may input with the driver system 30 various profile features such as identification and selected certifications. The driver 20 may interact with a dispatcher, such as an entity that controls or interacts with the logistics program/system 10 and/or directly with any one of the driver, the receiver 24, or the shipper 28. The driver 20, may be provided with optional loads delivered to the receiver 24 and/or provided with options from a logistics company or dispatcher. Further, as discussed above, the shipper 28 may also provide various profile features that may be similar to those of the receiver 24 with a shipper system 38, that may be similar to the receiver system 34 discussed above. Accordingly, each of the driver 20, receiver 24, and shipper 28 may provide a selected information that may be exchanged at appropriate times in a selected manner with the various other entities.

In use, the receiver 24 may interact with the selected shipper 28 to create a load to be delivered to the receiver 24 at a selected location, such as one or more of the locations with the input of the receiver system 34. A dispatcher or the driver 20 may become aware of a particular load and agree to accept and/or not accept the load via the logistics program/system 10. The system 10 may offer communications between the receiver 24 and the driver 20 and/or a dispatcher, which may be related to the driver, including an employer or contractor of the driver 20. The receiver 24 may also interact with the logistics program/system 10 to provide various profile features and/or understand the driver profile to agree to accept a delivery from the driver 20 and/or appropriate considerations.

Figure 3:
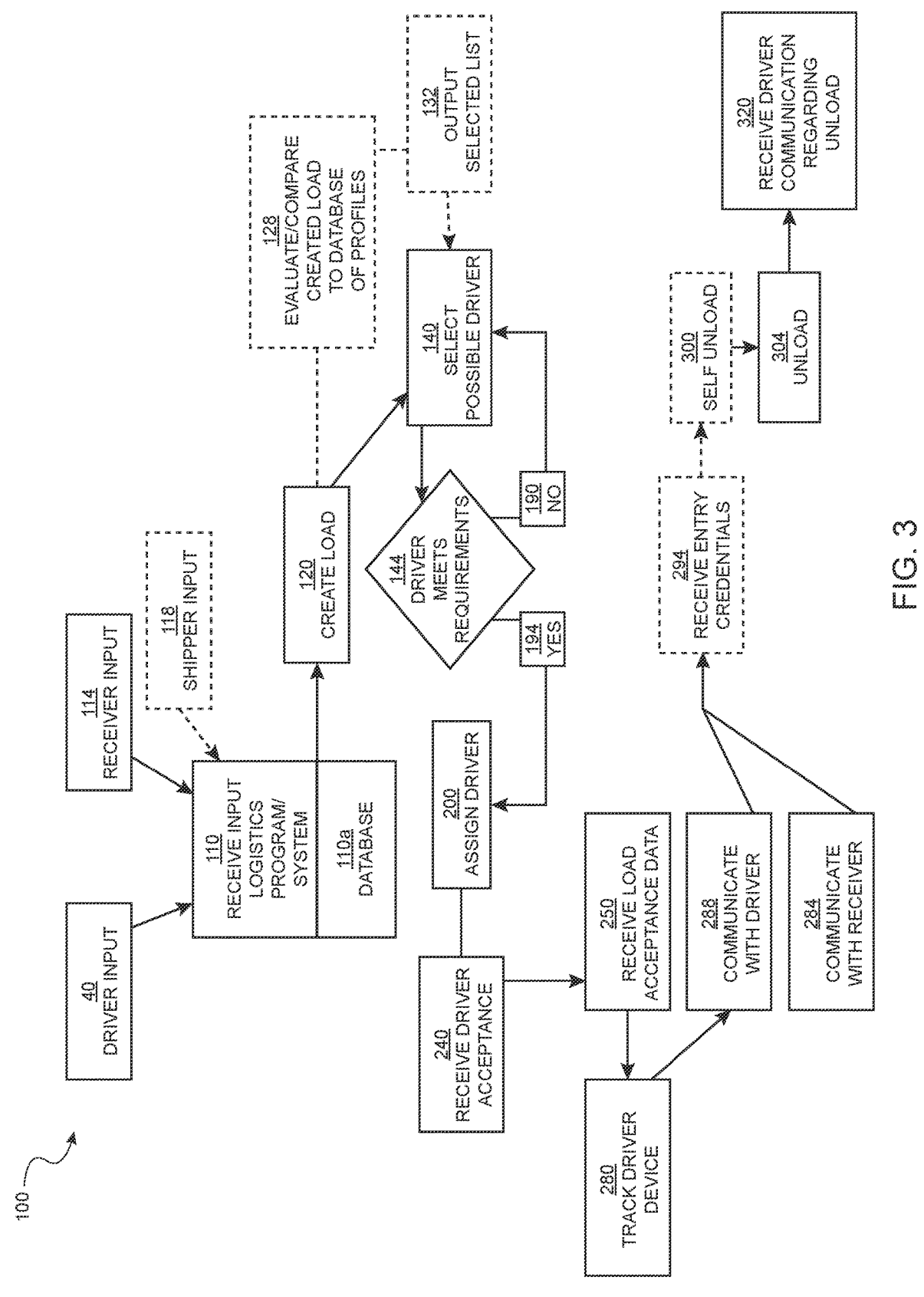
FIG. 3 is a flowchart of operation of a logistics system/program, according to various embodiments.

Turning reference to FIG. 3, a method 100 is illustrated. Initially, as discussed above, the driver 20 may provide a driver input or a driver profile 40 to be received by the logistics program/system 10 in block 110. Additionally, the receiver 24 may provide an input as a delivery or receiver profile with the receiver system 34 as a receiver input block 114. Similarly, the shipper 28 may provide a shipper inputter profile in 118. The shipper input in block 118 may allow for the shipper 28 may provide input, however, the receiver 24 may separately interact with the shipper 28 and not require a shipper input to be input and received in block 110. Nevertheless, the receiver input in block 114 may be input into the logistics system 10 in block 110 and the driver input from block 140 may also be input into the logistics program/system 10 in block 110.

Figure 4:
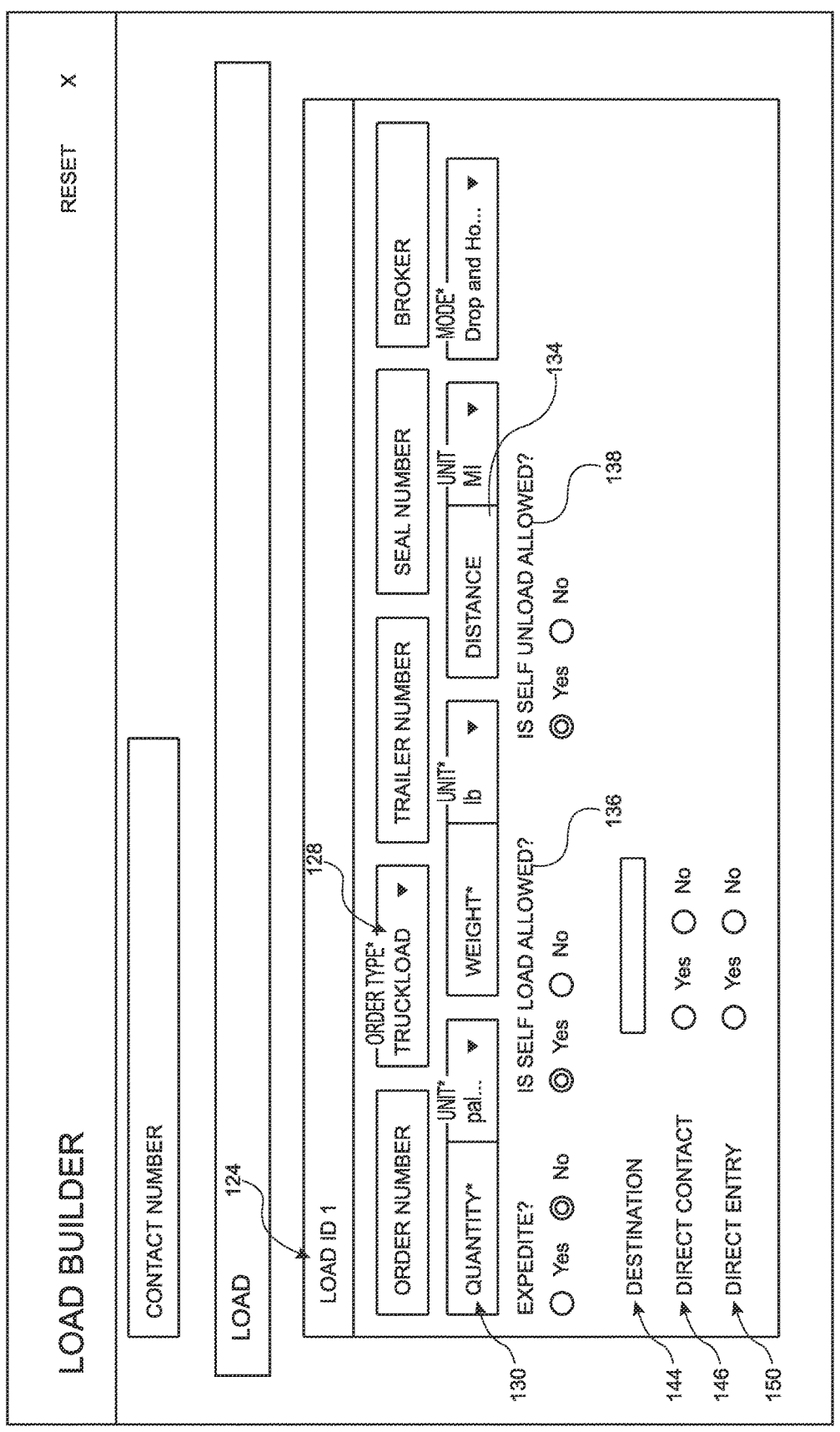
FIG. 4 is a user interface for a load builder screen, according to various embodiments.

A load may be created and input or received in block 120. The creation of a load in block 120 may include various features or actions, such as the receiver 24 identifying items for delivery, a time frame for delivery, a type of delivery, or the like. For example, with reference to FIG. 4, a load builder user interface may be used to create a load. The load builder interface may include identification of a load, such as a load ID1 124. The load builder may further include various information such as an order type 126, quantity of items to be delivered or received 130, distance to be traveled 134, and other appropriate features and information.

Further, the receiver 24 may identify in the load builder interface various additional features. For example, the receiver 24 may identify whether the load may be self-loaded and/or self-unloaded at 136,138 respectively. The receiver 24, therefore, may identify various features of a load, such as a load ID 124 and how a load may be delivered, such as discussed above. Further the receiver 24 will identify a destination 144, for example with an address, GPS coordinates, or the like. Thus, the driver 20 and/or other appropriate entity such as a logistics company, will understand the destination for the load. Further, the receiver 24 may identify whether direct contact with a site may be made at 146 and/or whether entry may be provided at 150. As discussed above, direct entry may include providing credentials to the driver 20 to allow access to a delivery site or destination without onsite assistance.

Accordingly, the receiver 24 may provide a load that is identified in the load ID 124 that may be provided or allowed for the driver 20 to deliver. Various drivers may be identified as possible drivers for the particular load and a dispatcher may provide access and/or an assignment of the load to a particular driver. Nevertheless, a particular driver or a selected driver may be identified as a possibility or selected driver for delivering the load 124.

A load that is created in block 120, as discussed above, will have particular requirements and/or features. These features may be received by the logistics program/system in block 110 as an input and/or evaluated by the logistics program/system once the load is created in block 128. The evaluation in block 128 is optional, however, and may not be required. Nevertheless, the load created may have various features such as self-load or unload and/or restricted entry to a certified group or individuals. As discussed above, profiles from the driver may be input from block 40 and other profiles may be input from block 114 and block 118 to the logistics program/system in block 110. The system may generate a database in block 110*a* that may be used to evaluate or compare in block 128 to the created load from block 120.

The evaluation may compare the created load from block 120 to the database in block 110*a* to determine possible shippers, drivers, or the like. Therefore, the logistics system may evaluate a created load from block 120 to determine a proposed list or possible list of drivers from the database in block 110*a* in the evaluation block 128. The evaluation block 128 may allow for a limited set of drivers to be displayed and/or proposed for a particular shipping or load created in block 120. As noted above, for example, the drivers may input with their profile 40 a certification for forklift operation. If a load is created with a self-unload ability and/or requirement, the drivers with the certification may be evaluated and applied to the proposed list while ones that are not certified may not be provided in the possibility list. Accordingly, the system may output a possible driver list to various individuals, such as a dispatcher, receiver, or the like.

Once the evaluation is made, including a comparison of the created load to the database, an output list of selected drivers may be made in block 132. Again, it is understood that the list of output drivers in block 132 is optional and is not required. Nevertheless, the output list of selected drivers may include those that match the created load based upon the input driver profile from block 40. This may allow for an efficient selection of a driver based upon the created load from all possible drivers that may exist relative to the logistics program/system and/or are available. Therefore, the output selected list may allow for an efficient selection of a driver for a particular load without requiring specific or individual contact regarding the various drivers.

Figure 5:
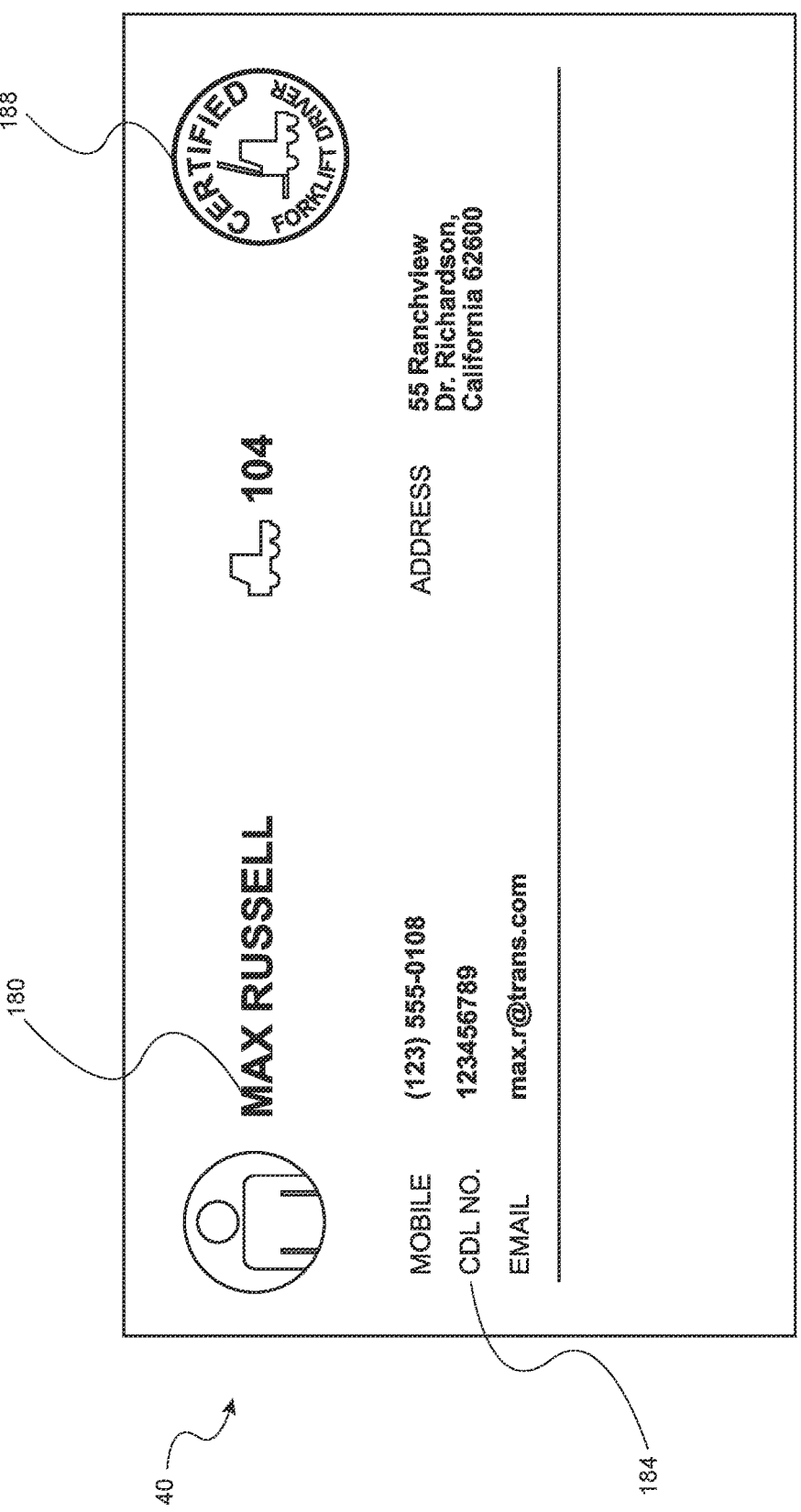
FIG. 5 is a profile screen of a driver, according to various embodiments.

Regardless of whether the logistics program/system evaluates the profiles to determine a list of selected drivers in bloc 132, or a list is based upon only the created load from block 120, selected possible drivers may be determined and/or output in block 140. Determined drivers may include those that are available, or the like. Based upon the selected possible list and/or the output selected list from blocks 140, 132 respectively, driver requirements may be confirmed or evaluated in block 144. For example, if a load allows and/or requires self-unload, a confirmation of a driver's certification for forklift operation may be made in block 144. The driver profile, as illustrated in FIG. 5, may include various features, such as the identification of the driver 180, contact information regarding the driver 184 and/or various certifications, such as a forklift certification 188. Thus, the profile 40 of the driver may include various information that may be confirmed regarding the created load from block 120.

If a selected possible driver does not include the required certifications a NO path 190 may be followed to the select possible driver block 140. Therefore, the system that may loop to select from possible drivers and confirm requirements until a driver meets requirements. Once a driver is found that meets the requirements, a YES path 194 is followed. It is understood that other inputs may be included, such as a dispatcher preference and/or assigned driver for the selection of a possible driver in block 140. Thus, confirming a qualification may not be the only determination following the selection of a possible driver in block 140. Also, the selection of a possible driver in block 140 may include a manual input (e.g., from a dispatcher), but does not require manual input.

Figures 6, 7:
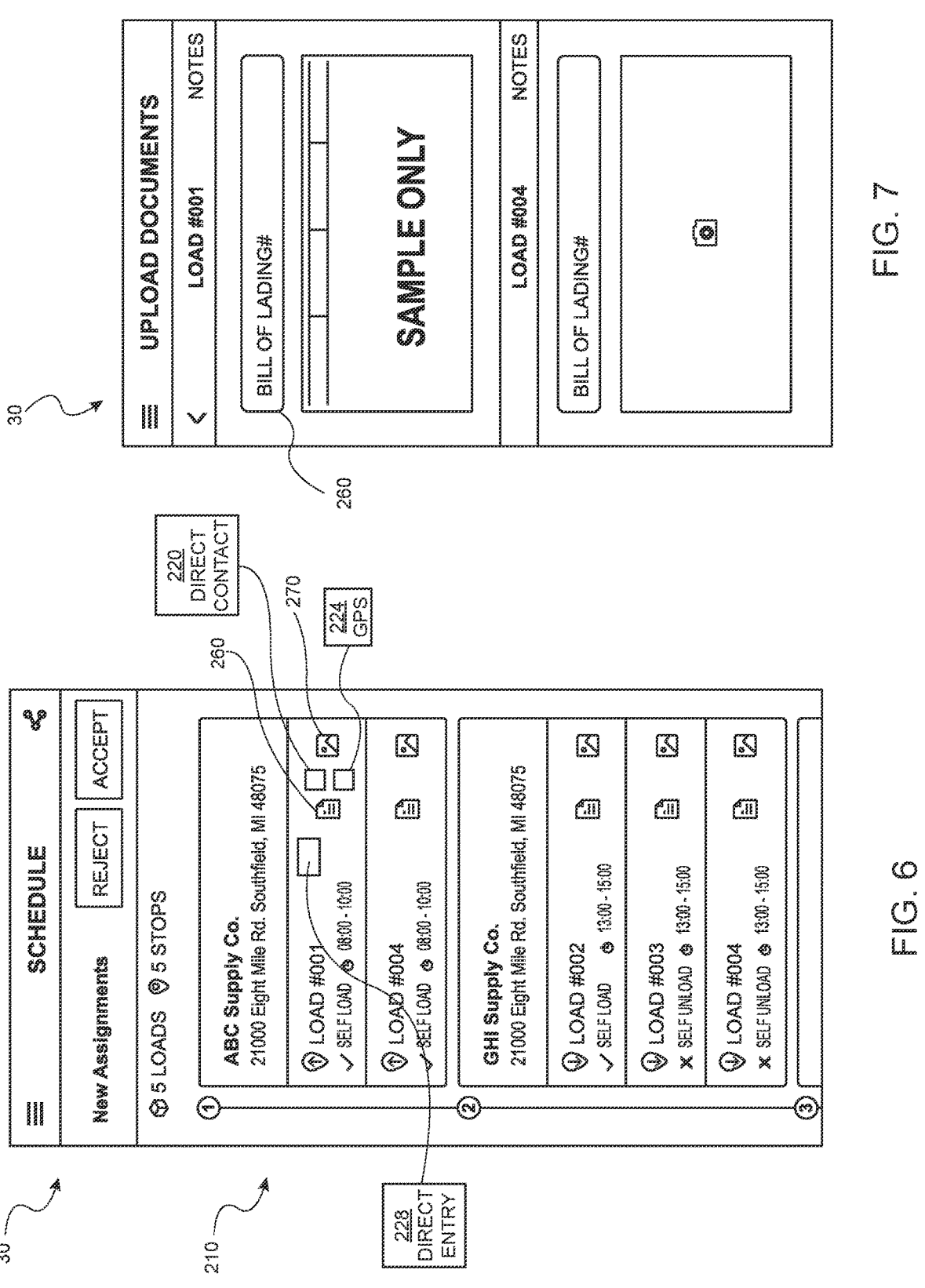
FIG. 6 is a user interface screen shot of a driver system, according to various embodiments.
FIG. 7 is a user interface screen shot of a stakeholder system, according to various embodiments.

Once the YES path 194 is followed, a driver may be assigned in block 200. Assigning a driver may allow for one or more load assignments to be assigned to a selected driver. The driver 20, therefore, may receive the selected loads on the driver system 30, as illustrated in FIG. 1 and FIG. 6. The driver system 30 may include a device, as discussed above, including a portable phone, touch screen device, or the like. Nevertheless, the driver device 30 may include a screen or section that includes load assignments and/or possibilities 210. The driver 20, therefore, may confirm acceptance and/or rejection of various assignments/loads, if allowed. For example, the driver 20 may be contracted to deliver certain loads and/or allowed selection of loads.

The various loads may be provided to the driver with various specifications, such as allowing self-unload or not allowing self-unload. Further, various contact information may be provided with each of the respective loads. For example, as illustrated in FIG. 6, load number 001 may have a direct contact block 220 to allow the driver 20 to contact directly, such as through the logistics system 10, a party (e.g., manager) of the receiver at the receiving location. The driver system 30 may also include a block or icon to indicate that GPS tracking is occurring with an icon block 224. Further, the user interface may include blocks or icons 260 for accessing portions to import, review, and/or complete loading documents. Also, the user interface may include an icon 270 to allow access to and/or uploading of selected photos, such as of the load at selected times.

A driver may select the load number 001 and either accept or reject it with the driver device 30. Once the load is accepted, the driver 20 may communicate directly with the receiver 24 which may be or have direct communication with an onsite individual or onsite locations for communication directly with a receiver site. Further, the GPS 224 may allow for continuous and real-time GPS tracking of the driver device 30 that is maintained with the driver 20 to allow the receiver 24 to have knowledge (e.g., real time information) of a location, substantially in real-time, of the load. This may assist the receiver 24 in preparing for receipt of the load, providing instructions to the driver 20 in substantially real-time, and the like. Similarly, the driver 20 may use the direct contact module 220 to directly contact or communicate with receiver 24 to provide updates and/or request instructions regarding load placement, entry instructions, and/or the like.

Also, the load, such as the load 001, may allow a direct entry 228 that may be accessed by the driver 20. As discussed above, the driver device 30 may allow for real-time tracking of the driver 20 and/or the driver device 30. Thus, the direct entry 228 may be geo-fenced to the receiver location and allow for provision of direct entry information, such as direct entry of credentials (e.g. personal identification number) at a selected time and/or location of the driver device 30. The driver device 30, with the driver 20, therefore, may allow for specific and limited access to the driver 20, such as with a code provided based on a geo-fenced location, verbal identification (e.g., with direct communication), or other appropriate secure entry method.

The driver device 30 may allow for communication with the receiver 24 in substantially real-time. The driver device 30 may also allow for communication to the driver 20 of various information such as direct entry information and tracking of the load. This may allow for provision of selected or secure information at only selected and/or limited times that may be time-sensitive and/or restricted and/or location restricted.

According to various embodiments, therefore, the driver device 30 may be used to communicate with the driver 20 and/or allow the driver 20 to communicate with the receiver 24.

With continuing reference to FIG. 3, as discussed above, a driver may accept a load, such as with the driver device 30, and the method 100 may include receipt of the driver's acceptance in block 240. The driver may then provide information to the system regarding the load received and accepted in block 250. The accepted load data may include a tracked location of the load acceptance, a completion of one or more bill of lading documents, such as with the driver device 30 as illustrated in FIG. 7. Load documents 260 may be viewed, access, and completed by any of the appropriate user systems. The load documents may include a bill of lading 260 that may include time of acceptance or loading on to the truck, loading by the driver information (e.g., loaded by self-load), or other appropriate information regarding the accepted load. Additionally, the driver may provide photographs, such as a photograph 270. The photograph may be taken and/or sent with the driver device 30. The photograph 270 may be of the load at any selected time, such as at loading and/or at unloading. The photograph may be used to provide evidence of condition of the load at respective times. Nevertheless, the information received in block 250 may include information regarding the received load that is provided by the driver 20 and/or authenticated and/or confirmed by individuals at a loading location.

Once the load is received, the driver device may be tracked in block 280. Tracking the driver 20 may include tracking the driver device 30, or other appropriate tracking device. Nevertheless, tracking information may allow for a substantially real-time determination of a location of a load accepted by the driver 20. The tracking information may be provided to the logistics system 10 and access may be granted to selected users, such as the received 24. Thus, the receiver may understand a real time location of the load, such as with a user interface 330 of the receiver system 34. The user interface 330 may include a map 334 and a path or location 338, as discussed herein.

During transit of the load, including at or near the receiver site, communication may be made with the receiver in block 284 and/or with the driver in block 288. The communication with the receiver or driver, 284, 288 may be directly between the driver and receiver and/or between selected intermediaries. The communication may be performed through the logistics system 10 that includes selected communication modules. The communication modules may be secure and include verbal, visual, and/or text based communication.

The driver device 30 may receive and/or send the communication to allow for substantially direct communication with the driver 20 at any appropriate time. For example, when the driver is determined to be near the receiver site, such as by tracking the driver device in block 280, the receiver 24 may be identified, such as with the receiver device 34. The receiver 24 may then directly contact the driver 20 via the driver device 30 by communicating with the driver in block 288, such as via the logistics program/system 10. The receiver 24 may provide instructions such as a delivery location at the site, credentials to enter the site, or other appropriate and/or selected information for the driver 20. Accordingly, the logistics program/system may offer substantially direct communication between the receiver 24 and the driver 20 to efficiently communicate information regarding a specific load and delivery. Moreover, the logistics program/system 10 may allow for confirmed and/or credentialed and secure communication for the selected driver and/or delivery.

The method 100, therefore, allows for communication with the driver 20 at any appropriate time. As discussed above, the driver 20 may be communicated with regarding specific delivery locations or sites at a receiver site (e.g. a specific location on the site, a specific dock number, etc. . . . ) and/or a specific time when a receiver will be present, such as a specific time within a selected delivery time frame. Moreover, the driver 20 may receive entry credentials from the logistics program/system 10 at block 294 to the driver system 30, if selected.

As discussed above, the entry credentials may include a PIN number, an RFID entry code, or the like to allow entry to a specific receiver site. The entry credentials may be received may be time-based, geo-fenced, or the like (such as relative to the driver device 30). Therefore, the entry credentials may be limited only to those at a specific site (e.g., location) and/or with a specific load.

The method 100 may then instruct and/or allow for the self-unload in block 300 and/or instruct the driver 20 a location for unloading in block 304. The further instr4uction may be provided in the delivery site profile, as discussed above, and/or provided with direct communication in block 288. Therefore, the driver 20 may unload if a self-unload site and/or the unloading may occur from the driver truck. Nevertheless, the load may be unloaded at the receiver site. Again, self-unloading may allow for the driver 20 to provide a flexible delivery of a load to the receiver 24. Moreover, self-unload may allow for a reduction in labor at the receiver site by not requiring an unloader. Moreover, the driver 20 may not be limited to delivery times when only an unloader is present.

As discussed above, the driver 20 may provide data regarding the load as the unload happens and/or post unload such as with providing photographic evidence of the unload status, photographic evidence of the unload location, and the like, such as reference to FIG. 8. Further, the driver 20 may provide unloading documents with the driver device 30, such as illustrated in FIG. 7. The information may be received from the driver in block 320 for access by each of the stakeholders with the logistics program/system 10. The data may include the location of the unload, the condition of the unload, an identification of damage is additional, if any is identifiable (such as after the original loading of the load), or other selected information. The receiver profile may include required information and the driver 20 may provide the information with the driver system 30. Nevertheless, the logistics program/system 10 may receive the driver communication including the unloading information such as location, condition, and the like. Thus, the system 10 may include information regarding the loading and unloading of a load from the shipper location from the shipper 28 to the receiver location at the receiver 24.

The logistics program/system 10, therefore, may allow for a unified location and/or access of information regarding a particular load. For example, with reference to FIG. 9 the user interface 330 for the logistics program/system 10 may include various information such as a map 334 including a route of travel 338 of the load based upon the real-time tracking. Further, any selected stakeholder may access the map during transit to identify a location of the load during transit. Further, various information such as loading condition, unloading condition, bill of lading, and the like may be provided in a data location 344 in the user interface 330. Therefore, any appropriate stakeholder may be able to review information regarding a specific load at any appropriate time, such as during loading, transit, identifying a driver, or the like. This may allow for a single system to include information and provide information to various stakeholders or users to limit or eliminate need for access to multiple applications and/or requesting of individualized information from various specific users at different times. The information may be uploaded and provided to selected users with the logistics program/system.

Conclusion

The logistics system and the method of using and incorporating the logistics system, according to various embodiments, may have various effects on logistics, including shipping, loses, etc. For example, labor may be reduced as a drive may perform more than one task, e.g., loader and unloader and driver. Further, extra labor required for specific time of delivery may be eliminated or reduced. This may also lead to increased safety given specific and up to date/timely instructions to a driver for delivery. Further, the driver knowing how to operate additional machinery may decrease likelihood of confusion and/or accidents. This additionally, may create velocity in the supply chain. The driver would not need to wait for additional assistance to a loading point or a delivery point. Further, time of delivery may be more flexible and limited to "open" or "business hours" of a delivery or loading location. Therefore, bottle necks in the supply chain may be reduced or time may be reduced at them.

The reduced labor, velocity, flexibility etc. May all further lead to reduced emissions and fuel burn which, in turn may reduce carbon dioxide ($CO_2$) emissions and/or other environmental hazards. As reduced time in transit, idle time, or the like allows for such savings. This, in turn, may allow for trading of such savings (e.g., Carbon credits).

Moreover, a new specialty may be created. The driver as an entrepreneur can solve and/or assist in solving or alleviating the above noted issues and lead to the above noted benefits. This allows the driver to assist in improving the supply chain logistics, transport time, labor savings, etc. The driver may, therefore, be further productive and have tasks and solutions in addition to driving.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Instructions may be executed by a processor and may include may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, ASP, Perl, Javascript®, HTML5, Ada, ASP (active server pages), Perl, Scala, Erlang, Ruby, Flash®, Visual Basic®, Lua, Python®, and/or Django. In addition, various toolkits and/or APIs may be used and implemented in the computer programs.

Communications may include wireless communications described in the present disclosure can be conducted in full or partial compliance with IEEE standard 802.11-2012, IEEE standard 802.16-2009, and/or IEEE standard 802.20-2008. In various implementations, IEEE 802.11-2012 may be supplemented by draft IEEE standard 802.11ac, draft IEEE standard 802.11ad, and/or draft IEEE standard 802.11ah.

A processor or module or 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

What is claimed is:

1. A method of implementing a transportation of an item with a logistics program executed by a logistics system, comprising:

operating a receiver user input to generate a receiver profile by and from at least a receiver entity having a receiver location, wherein the receiver profile includes a self-unload qualification allowance and is configured to update a display to display the self-unload qualification allowance;

operating a database user input to generate a qualification database by a database user that includes a plurality of drivers and related driver qualifications of a plurality of drivers;

operating a logistics system having a processor to execute instructions of the logistics program to transport an item to:

receive the receiver profile;

based on an input from the logistics system, access the receiver profile;

access the qualification database;

determine a qualification of a driver that fulfills the self-unload qualification allowance of at least one of the receiver entity or the receiver location based on the accessed receiver profile;

identify at least one qualified driver from the accessed qualification database of the plurality of drivers that has the determined qualification;

coordinate a match that is efficient between the identified at least one qualified driver and the receiver entity and the receiver location based at least real-time availability of at least the identified at least one qualified driver;

output the coordinated match operable to allow the identified at least one qualified driver to self-unload the item at the receiver location to the receiver entity;

communicate the identified at least one qualified driver of the outputted coordinated match that is operable to unload the item at least at one of the receiver entity or receiver location without assistance to the receiver entity or receiver location to the receiver entity and a driver device;

receive from the driver device a location of the driver device;

transmit from a logistics system location via the logistics system to the driver device based on the receiver location of the driver device an access permit to the driver to allow access to the receiver location;

transmit from the driver device to the receiver location the access permit to allow the driver access to the receiver location;

communicate permissions for the unloading of the item by the qualified driver at the receiver location due at least to the transmitted access permit;

receive a communication from the driver device from the at least one qualified driver to the receiver entity via the logistics system at least one of a picture acquired as evidence of load condition or selected load documents from the qualified driver;

allow access to information of load condition of the load or the selected load documents to the receiver entity at least by (1) acquiring with the logistics system the evidence of load condition, including the picture, after unloading from the driver device and (2) transmitting the evidence to a load condition database;

create velocity in a supply chain via at least the transmitting the access permit and the unloading by the qualified driver; and communicate real-time tracking and updates to the receiver entity regarding a status of the item;

interactively communicating with the driver device including transmitting and receiving the real-time tracking and the at least one of a picture acquired as evidence of load condition or selected load documents from the qualified driver; and transmit to the driver device secure entry credentials from the logistics system based on the real-time tracking location of the driver device;

wherein the secure entry credentials and at least one of a direct communication or a geo-fencing are evaluated by the logistics system to automatically open a gate at the receiver location to allow the qualified driver to access an unloading equipment at the receiver location; and wherein the logistics system is operable to authorize operating the unloading equipment at the receiver location by the identified qualified driver to unload the item based on the access to the receiver location by the opening of the gate and the automatically coordinated match with the logistics program between the driver and the receiver entity profile.

2. The method of claim 1, wherein the qualification includes a forklift operator certificate that is acceptable to the receiver entity to operate a forklift at the receiver location;

wherein the forklift operator certificate is included in the qualification database separate from the logistics program.

3. The method of claim 2, further comprising:

communicating with the logistics system a determined location of the driver; and transmitting via the logistics system the access permit to a driver device that is with the driver only when the driver is at a selected location based on the determined location of the driver.

4. The method of claim 3, wherein the selected location is within a selected range of the receiver location;

wherein the communicated determined location is based on a driver tracking system with the driver.

5. The method of claim 2, further comprising:

executing instructions with a processor module to at least identify the qualified driver from the plurality of drivers, coordinate the match between the identified qualified driver and the receiver, and output the coordinated match to the receiver; and generating a graphical user interface for display including an identity of the qualified driver from the plurality of drivers, and an updated icon to indicate at least one of the self-unload qualification allowance, direct entry, direct contact, or combinations thereof.

6. A system, comprising:

a receiver entity input configured to generate a profile by and from at least a receiver entity having a receiver location, wherein the receiver profile includes a self-unload qualification allowance;

a database user input configured to generate a qualification database of a plurality of drivers and related driver qualifications of a plurality of drivers;

a logistics management server including a processor configured to execute instructions to:

receive via an interface a determined profile of at least a receiver entity having a receiver location, wherein the profile includes a requirement of a self-unload;

evaluate a qualification of a driver using real-time data from a certification database distinct and distant from the receiver entity to fulfill the requirement of at least one of the receiver entity or the receiver location;

evaluate a plurality of drivers to identify a qualified driver from the plurality of drivers based on the evaluation;

generate a display including automatically arrange a list the identified qualified driver;

receive information regarding a load including a communication from a driver system from the qualified driver to the receiver entity via the logistics system at least one of a picture acquired as evidence of load condition or selected load documents from the qualified driver; and allow access to information of the evidence of load condition of the load or the selected load documents to the receiver entity;

an input device including a user interface having a graphical portion including a load builder user interface to create a load having at least one of an identification of the load in a load block, an order type block, a self-loaded and/or self-unloaded identification block, an identify a destination block, an identification of direct entry block, or combinations thereof; and an output device to transmit the output identified qualified driver to at least one of the receiver entity or a selected user;

the driver system carried with the identified qualified driver and configured to communicate with the logistics management server;

wherein the output device is configured to convey to at least one of the receiver or a selected user the output identified qualified driver to create velocity in a supply chain via at least the qualification of the driver and real-time updates regarding the identified qualified driver;

wherein the logistics management server is operable to grant access to the identified qualified driver via a communication to the driver system to (i) communicate to allow access through a gate and (ii) operate unloading equipment at the receiver location and the identified qualified driver is thereafter able to operate the unloading equipment to unload an item;

wherein the driver system receives secure entry credentials from the logistics management server based on a tracked location of the driver system;

wherein the secure entry credentials and at least one of a direct communication or a geo-fencing are evaluated by the logistics management server to automatically open the gate at the receiver location to allow the qualified driver to access the unloading equipment at the receiver location; and wherein the logistics management server is operable to authorize operating the unloading equipment at the receiver location by the identified qualified driver to unload an item based on the access to the receiver location by the opening of the gate and the automatically coordinated match with the logistics program between the driver and the receiver entity profile.

7. The system of claim 6, wherein the driver system includes a driver input and a driver output to allow a communication to the qualified driver and from the qualified driver from the logistics management server;

wherein the driver output includes a display screen configured to automatically update to include at least one display feature that illustrates the driver as the identified qualified driver including the self-unload, direct entry, location information and tracked location information.

8. The system of claim 7, wherein the driver system is tracked to determine the tracked location of the identified qualified driver;

wherein the tracked location is communicated to the logistics management server.

9. The system of claim 7, wherein the driver system transmits information to the logistics management server regarding a load being transported by the qualified driver.

10. The system of claim 9, wherein the information includes photographs.

11. A method of coordinating transport of an item, comprising operating a logistics program for:

receiving a receiver entity profile of at least a receiver entity to the logistics program that includes a receiver location and at least one qualification for transport of a load;

receiving a driver profile to the logistics program of a driver;

automatically accessing a database of a plurality of driver qualifications of a plurality of drivers;

automatically determining a driver qualification based on the received driver profile and the accessed database;

automatically, by executing instructions of the logistics program with a logistic processor system of the logistics program, evaluating whether the driver qualification fulfills the qualification for transport of the load;

automatically coordinating a match with the logistics program between the driver and the receiver entity profile based on the qualification for transport of the load and the driver qualification based on the received driver profile and the accessed database;

outputting to a receiver interface of the receiver entity a coordinated match driver that includes the coordinated match; and communicating automatically from the logistics program with the coordinated match driver via a driver system during a transit of the load by at least one of (i) transmitting a secure access information to the coordinated match driver based on real time geofenced location of the coordinated match driver or (ii) receiving information regarding the load;

wherein the receiving information regarding the load includes receiving a communication from the driver system from the at least one qualified driver to the receiver entity via the logistics system at least one of a picture acquired as evidence of load condition or selected load documents from the driver;

allowing access to information of the evidence of load condition of the load based at least on the least one of a picture or the selected load documents to the receiver entity;

evaluating the transmitted secure access information with the logistics processor system according to the logistics program to open a gate at the receiver location to allow the driver to access an unloading equipment at the receiver location; and authorizing and operating an unloading equipment at the receiver location by the identified qualified driver to unload an item based on the access to the receiver location by the opening of the gate and the automatically coordinated match with the logistics program between the driver and the receiver entity profile.

12. The method of claim 11, wherein the logistics program receiving the driver profile of the driver includes receiving a plurality of driver profiles from a plurality of drivers;

wherein the logistics program evaluating whether the driver qualification fulfills the qualification for transport of the load includes evaluating at least a sub-plurality of the plurality of driver profiles;

wherein outputting to the receiver interface of the receiver entity includes generating and displaying a graphical user interface including at least the coordinated match driver.

13. The method of claim 12, wherein the qualification includes a forklift operator certificate that is acceptable to the receiver to operate a forklift at the receiver location for self-unload requirement to self-unload of the load at least at one of the receiver entity or the receiver location;

wherein the database includes forklift operator certificates for the driver.

14. The method of claim 13, wherein transmitting a secure access information to the coordinated match driver includes:

determining a location of the coordinated match driver that is a dynamic real time location;

transmitting the access permit from the logistics program to the driver system only when the driver is at a selected location; and accessing the receiver location through a gate based on the transmitted secure access information transmitted to the driver system.

15. A method of coordinating transport of an item to allow a unified communication and load information system, comprising:

generating a receiver entity profile based on an input from at least a receiver entity having a receiver location, wherein the receiver profile includes a self-unload qualification allowance;

generating a driver profile based on an input from a driver including a qualification of a driver;

generating a driver qualification database of a plurality of driver profiles and related driver qualifications of a plurality of the drivers;

executing instructions of a logistics program with a logistics system for:

(1) accessing the receiver entity profile;

(2) accessing the driver profile of a driver via an input device including a graphical user interface including a load builder user interface;

(3) automatically accessing the driver qualification database separate from the driver profile;

(4) automatically determining the driver qualification based on the received driver profile and the accessed database having the driver qualification;

(5) automatically evaluating whether the driver qualification fulfills the qualification for transport of the load at least by comparing the driver qualification database and the receiver entity profile;

(6) automatically coordinating a match between the driver and receiver entity based on the received receiver entity profile, the accessed database, and the received driver profile;

(7) displaying at least via the graphical user interface a coordinated match driver to at least one of the receiver entity or the receiver location;

(8) automatically receiving at the logistics system the real time dynamic location of the coordinated match driver by tracking a driver device carried with the coordinated match driver;

(9) automatically determining that received the real time dynamic location of the coordinated match driver meets at least one selected parameter of the receiver entity profile; and

(10) automatically transmitting to and outputting to the driver device the secure access information only when the real time dynamic location is determined to meet the selected at least one parameter;

(11) automatically communicating in real time from the logistics system to the driver device in real time during a transit of the load including transmitting a secure access information to the coordinated match driver based on at least the automatically received real time dynamic location of the driver device, wherein the secure access information allows access a secure site of the receiver location;

(12) transmitting the secure access information from the driver device to obtain access to a secure site of at least one of the receiver entity or the receiver location based on the secure access information transmitted to the driver device from the logistics system;

(13) evaluating the transmitted secure access information with the logistics processor system according to the logistics program to open a gate at the receiver location to allow the driver to access an unloading equipment at the receiver location;

(14) authorizing and operating an unloading equipment at the receiver location by the identified qualified driver to unload an item based on the access to the receiver location by the opening of the gate and the automatically coordinated match with the logistics program between the driver and the receiver entity profile;

(15) automatically creating velocity in a supply chain by allowing the coordinated match driver to unload the load at the secure site to increase efficiency of transporting the load;

(16) automatically communicating to the receiver entity the real time dynamic location of the coordinated match driver;

(17) displaying with a display of the driver device at least one of a plurality of loads and at least one of a location of the driver device, a direct entry such that the coordinated match driver accesses the secure access; loading documents, or a condition picture; and

(18) communicating from the driver device to the receiver entity via the logistics system to allow access to information of a condition of the load and selected load documents including at least the picture of the load acquired by the coordinated match driver with a camera via the driver device;

wherein the at least one qualification for transport of the load includes a self-unload ability or requirement;

wherein the secure access information and the allowed access automatically allows the coordinated match driver to self-unload with a forklift;

wherein the coordinated match driver is the driver with the driver device to obtain access to the secure site through a gate of at least one of the receiver entity or the receiver location and self-unload with the forklift.

16. The method of claim 15, further comprising:

indicating and providing direct communication from the receiver entity to the coordinated match driver with a user interface of the driver device;

at least one of importing, reviewing, or completing loading documents via the user interface and communicating with the logistics system;

at least one of accessing or uploading selected the picture of the load at selected times.

17. The method of claim 2, wherein the creating velocity in the supply chain includes at least one of reduced labor, reduced emissions, reduced fuel usage, reduced transit time, or combinations thereof.

18. The method of claim 15, further comprising:

creating a load with the graphical user interface having at least one of an identification of the load block, an order type block, a self-loaded and/or self-unloaded identification block, an identify a destination block, an identification of direct entry block, or combinations thereof;

communicating the load to the driver device and displaying at least one of the location of the driver device, the direct entry such that the coordinated match driver accesses the secure access, the loading documents, or the condition picture.

19. The method of claim 15, further comprising:

operating the logistics system to grant access to the coordinated match driver via a communication to the driver device to (i) open the gate based on the communication to allow access through the gate and (ii) operate unloading equipment at the receiver location and the coordinated match driver is thereafter able to operate the unloading equipment to unload the item; wherein the creating velocity in the supply chain further includes at least one of reduced labor, reduced emissions, reduced fuel usage, reduced transit time, or combinations thereof.

20. A system, comprising:

a logistics management server including a processor configured to execute instructions to:

receive a determined profile of at least a receiver and receiver location;

evaluate a qualification of a driver using data from a certification database distinct from the receiver entity to fulfill the requirement of at least one of the receiver entity or the receiver location;

identify a qualified driver from a plurality of drivers based on the evaluation; and output the qualified driver; and grant access to the identified qualified driver via a communication to a driver system to (i) communicate to allow access through a gate and (ii) operate unloading equipment at the receiver location and the identified qualified driver is thereafter able to operate the unloading equipment to unload an item; and an output device configured to transmit the output qualified driver to at least one of the receiver or a selected user;

wherein the driver system receives secure entry credentials from the logistics management server based on a tracked location of the driver system;

wherein the secure entry credentials and at least one of a direct communication or a geo-fencing are evaluated by the logistics management server to automatically open the gate at the receiver location to allow the qualified driver to access the unloading equipment at the receiver location; and wherein the logistics management server is operable to authorize operating the unloading equipment at the receiver location by the identified qualified driver to unload an item based on the access to the receiver location by the opening of the gate and the automatically coordinated match with the logistics program between the driver and the receiver entity profile.

\* \* \* \* \*